(12) United States Patent
Mannings

(10) Patent No.: US 6,324,266 B1
(45) Date of Patent: Nov. 27, 2001

(54) INFORMATION GATHERING SYSTEM

(75) Inventor: Robin Thomas Mannings, Suffolk (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/202,072

(22) PCT Filed: Nov. 3, 1998

(86) PCT No.: PCT/GB98/03275

§ 371 Date: Dec. 7, 1998

§ 102(e) Date: Dec. 7, 1998

(87) PCT Pub. No.: WO99/26396

PCT Pub. Date: May 27, 1999

(30) Foreign Application Priority Data

Nov. 13, 1997 (EP) .................................................. 97309148

(51) Int. Cl.[7] .................................................. H04M 11/00
(52) U.S. Cl. .................................. 379/92.04; 379/92.02; 455/2.01
(58) Field of Search ............................. 379/92.01–92.04; 455/2.01, 555

(56) References Cited

U.S. PATENT DOCUMENTS

| 5,416,831 | 5/1995 | Chewning, III et al. . |
| 5,606,600 | 2/1997 | Elliott et al. . |
| 5,675,635 | * 10/1997 | Vos et al. ........................... 379/92.03 |

FOREIGN PATENT DOCUMENTS

| 0661897 A | 7/1995 | (EP) . |
| 0738093 A | 10/1996 | (EP) . |

* cited by examiner

Primary Examiner—Wing F. Chan
(74) Attorney, Agent, or Firm—Nixon & Vanderhye P.C.

(57) ABSTRACT

An audience participation system is disclosed, in which the users are invited to initiate a voting process by dialling a predetermined number using one of the conventional short code memory keys on a DECT cordless telephone 1, or specialized equipment incorporating DECT technology, are connected to a Computer/Telephony Interface (CTI) unit 4 via a wireless Private Branch Exchange (WPBX) 2. The Computer/Telephony Interface Unit can use calling line identity to identify any attempted callers who are not eligible to vote, e.g. calling from remote lines. Some remote lines may be authorised to allow votes to be contributed from authorized parties elsewhere than in the local auditorium. To vote, the users transmit DTMF tones using the keys of their telephone handsets, or speak into their handsets if voice prompts are to be used. A separate channel is provided between the Computer/Telephony Interface unit 4 and each cordless telephone or remote user. The Computer/Telephony Interface unit 4 can therefore identify each individual vote, and ensure that only one vote is received from each telephone. The DTMF tones or other are raw voting data which is transmitted to the computer 5 for analysing the raw voting data, for display of voting statistics to the audience on a display browser 6. Since the identity of each handset is known to the Computer/Telephony Interface Unit 4, demographic data previously stored relating to the individual users of the handsets, or to earlier voting results, may be correlated to provide further information for processing by the computer 5.

12 Claims, 3 Drawing Sheets

INFORMATION GATHERING SYSTEM

This invention relates primarily to opinion-gathering systems of the kind installed in conference centres and the like. The invention also has application to other fields, such as market research, proficiency examinations, building access control, and tourist guides.

Electronic voting is used to collect instant opinion from audiences at various events e.g. marketing or personnel events, television studio audiences, and in politics. Apparatus operated by the audience is used to deliver instant opinion on questions posed either by text projected on a screen or by a human compere. Voting is achieved by pressing a keypad. The votes are transmitted to a processor, which causes the results of the opinion survey to be generated from these votes.

At present, the equipment used for electronic audience participation and the other applications mentioned above is based on specialised terminals. For convenience these are usually 'cordless' devices using polled infra-red pulse communications. The audience is surrounded by infra-red base stations all linked to a computer which controls the system, and generates text and graphics for display of the results.

A question is posed by a human presenter or displayed as text on the screen. The audience members vote by pressing keys on their terminals and their percentage participation is displayed on the screen in real time. When all the votes have been made, the operator of the system disables the communications and enables the generation of a graphics screen, to display statistical data relating to the votes cast, e.g. as bar graphs. At the end of the session various printed reports can be generated.

The specialist Infra-Red equipment can interfere with the use of other infra-red equipment in operation at the same time, such as a remotely controlled slide projector. Moreover, the handsets are specialised for this application, making them relatively expensive. Furthermore, only the audience in the chamber (or other specially-equipped areas) can participate.

It is also known to provide audience participation facilities, usually for remote audiences such as television viewers, newspaper readers, etc. in which the audience is invited to telephone one of a series of numbers, according to their voting preference. Call-logging technology allows the number of calls made to each number to be measured, thereby measuring the votes cast. An example of such a system, known as "OPRA" (Opinion Poll Registration Application) is described by M Boomer in the *British Telecommunications Engineering Journal,* Vol 11, page 35 (April 1992). However, in such systems there is no control over who votes, and in particular multiple voting by the same person is difficult to prevent—although "Calling Line Identity" (CLI) facilities can nowadays be used to limit the number of calls to be accepted from any one telephone line. Moreover, many potential applications require a series of questions to be answered, but provision of sufficient telephone numbers to cater for each possible answer to each question would be difficult.

According to the invention there is provided a data collection system comprising
a data processing system for receiving data and generating statistical information relating to the data;
a plurality of data entry means, each for receiving data input from a user and transmitting the data to the data processing system;
and transmission means for transmitting data from the means (1) to the data processing system;
characterised in that the data entry means are telephone handsets, and that the data processing system has associated interface means for identifying the individual telephone handsets from which each data item is received, such that individual data items transmitted from the same handset can be related to each other by the processing system.

In a second aspect, there is provided a method of generating statistical information relating to data received from a plurality of data entry means, comprising the steps of:
transmitting signals from each data entry means to a data processing system by way of an interface means;
processing the data so received to generate statistical information relating to the totality of data received from the means;
characterised in that the data entry means are telephone handsets, and that the interface means identifies the individual telephone handsets from which each data item is received, such that individual data items transmitted from the same handset can be related to each other by the processing system.

The processing system may have means for transmitting audio or visual information to the handsets. The data collection system may generate an output for transmission using Internet protocols.

Preferably, the transmission means comprises a telephone switching system, and the interface means is arranged such that it will only accept telephone calls from telephone handsets associated with the switching means.

The telephone switching system and at least part of the data processing system may communicate with each other by means of the public telephone network, the telephone switching system having number translation means for conversion of short codes transmitted from the individual handsets into full telephone numbers for transmission over the public telephone network to the data processing system.

If the telephone calls are made through a private exchange, the interface means may be arranged to only accept telephone calls from handsets associated with the private exchange. Preferably the private exchange is a wireless (radio) exchange (WPBX), for use with "cordless" radio telephones. The use of standard radio equipment means that there is no infra-red interference with remote control equipment.

If the data entry handset communicates by means of a cordless connection, using a network of radio base stations, the location of the user apparatus can be identified by reference to the base station currently in radio communication with the user apparatus. The information generated may be processed according to the identified locations of the handsets.

If the processing system operates in conjunction with a private exchange, the specialised call-handling can be carried out without the need to modify the public switched network. This may be a "virtual" private exchange system, which is embedded in the public exchange and provides specialised facilities for a defined subset of telephone lines forming the private network. It should also be noted that the various elements, in particular the call handling switch (whether a conventional private exchange or a virtual system embedded in a public network) and the data processing system, need not be physically associated, but may communicate through any suitable data link. This allows several systems, based on different private exchanges, to share use of the same processing unit.

The telephone handsets may be standard telephones, or they may be units making use of standard cordless telephone components (which are manufactured in volume and are therefore cheap) but having more limited functionality than standard telephones (thereby making them less attractive to pilferers). They may, for example, have one or more keys non-operable, limiting their use to functions supported by the functioning keys. They may be arranged only to transmit keyed (DTMF) signals, and not conventional voice or data. Some simple applications of the invention may make use of simple handsets, arranged to only have the capability to transmit signals, and not receive. However, if a terminal is provided with two-way call facilities, personalised speech or audio streams can be provided to each participant. For example, voting instructions or results could be made available in several languages, the required language being selected for each handset according to its Calling Line Identity. This provision also allows the system to be interactive, for example by generating supplementary questions, selected according to the answer given to the first question. Other applications, such as examinations, may also make use of this two-way facility.

During voting, a call is made to a pre-programmed number which may be stored in the handset as a short code for translation in the handset itself, or at an intermediate point in the transmission means. Key presses can then be made to register votes. Alternatively voice recognition could be used. The display of results can be delivered using Internet/IntraNet technology. The handset identity can be identified using existing Calling Line Identity (CLI) codes, or the handset verification protocols used by cordless systems, or by a verification code generated by the handset and transmitted to the processing means when the call is first set up.

As well as simple opinion-seeking, the invention has other applications. For example, in the field of education, strict security is necessary in all aspects of proficiency examinations. In particular, the arrangements for distribution of question papers to examination centres must avoid any possibility that the candidates can have prior sight of the question papers. Similarly, the arrangements for the return of completed answer papers must avoid any possibility of substitution or tampering with the papers. It is also necessary to prevent candidates copying each other's answers during the examination itself.

The present invention allows examinations to be carried out "on-line", the questions being transmitted to the candidates, and the answers being transmitted to the examiner (or automated marking processor), instantaneously, thereby avoiding many of the security problems of conventional systems. Different candidates may be given the questions in a different sequence, or be required to give different responses for the same answer. In a "multiple-choice" question the candidates may all be presented with the same set of possible answers, but arranged in a different order, from which to select the correct answer. For example, the correct answer may require one candidate to press key "2", but for another candidate the correct answer requires key "3".

It is also possible to make the examination process interactive, so that the questions asked of the user depend on the answers given to previous questions. For example, if previous answers identify the candidate as borderline between "pass" and "fail", further questions may be asked to resolve the matter, whereas if the candidate's previous answers indicate a greater proficiency, more challenging questions may be asked, to determine whether the candidate merits a "pass with distinction".

The invention may also be used as an audio guide for exhibition visitors. When the user, carrying a portable unit, reaches an exhibit of interest, he presses a key on the unit for a commentary on the exhibit. The correct commentary is selected according to which key is selected (prompted by a label on the exhibit itself), by identification of the base station of a WPBX system with which the unit is currently in communication, or by a combination of these factors. The commentary can be tailored to the user's preferred language by an initialising process when the user is issued with the unit on entering the exhibition. Other user pre-sets may also be made, e.g. a special commentary suitable for children or other special interest groups.

If the portable unit has a visual display, audio-visual information can be provided to the user by means of the portable unit.

The invention can be used to generate statistical information relating to the popularity of individual exhibits. This data may be analysed according to the type of user, as determined from pre-programmed user preferences associated with those who request information on the exhibit.

The invention may also be used in a similar manner for shopping. In this arrangement the user tours a display area, and enters a code number into the portable unit for each displayed item he or she requires, either for later collection, or as the user removes the item from the display. The product may be identified using a bar code scanner forming part of the handset. Alternatively it may be identified by entering a code on the keypad which, in combination with the identification of the base station with which the handheld device is operating, uniquely defines the product, in a similar manner to that already described in relation to exhibitions. By relating the code to the location, simplified codes may be used which, if necessary, can be translated to standard "bar code" data by the data processing system. Audio information, for example relating to special offers, may be provided to the user in response to the selections made. The data collected on an individual customer's selections can be used for generating the customer's bill, for market research and for stock-control purposes.

The invention may also be used for processing bids in an auction, the bids being entered by users on their keypads and the current best bid being displayed for the information of the users.

The invention may also be used to monitor the movements of personnel, for example in an access-control system. In this case the entering of a code on the portable handset (either in response to a keystroke, or a prompt from the base station, gives the system information about the whereabouts of the bearers of those handsets. It may be linked to physical access control means, such as barriers which only open when an apparatus bearing a code authorising release of the barrier is recognised.

An embodiment of the invention will now be described, by way of example only, with reference to the Figures, in which.

Figure 1:
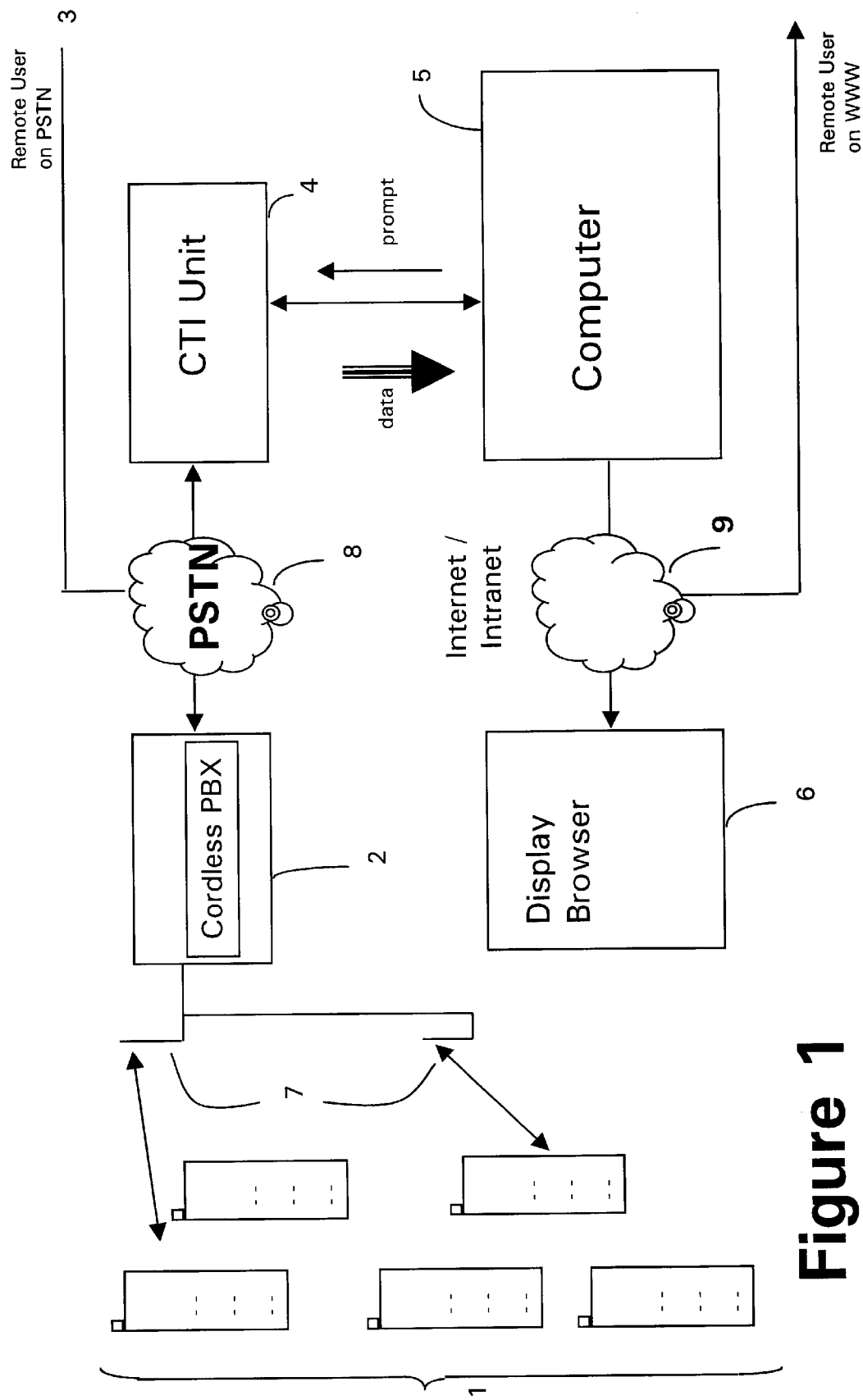
FIG. 1 illustrates schematically the complete system.
Figure 2:
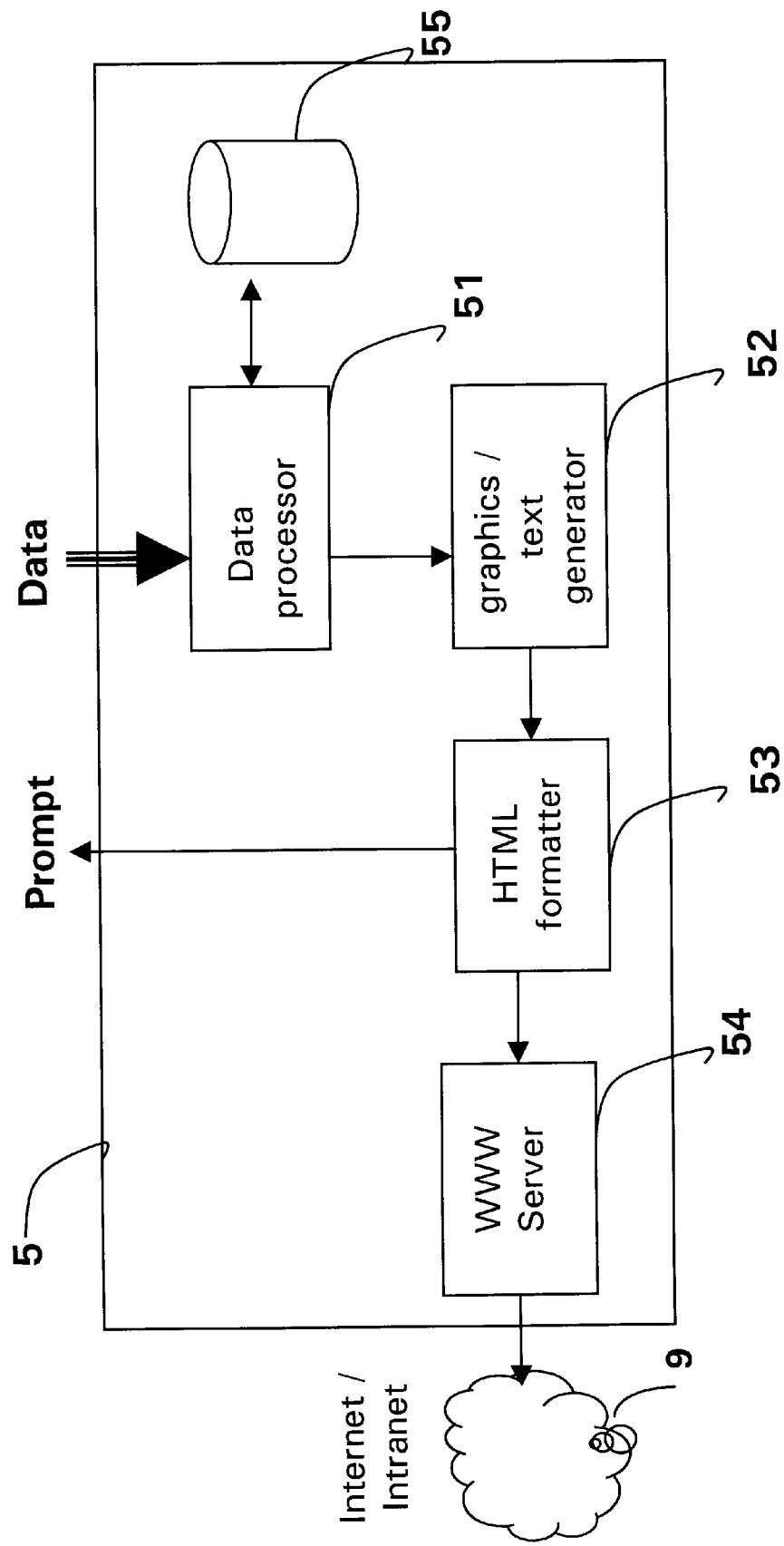
FIG. 2 illustrates schematically the functional elements of the data processing unit of the system.
Figure 3:
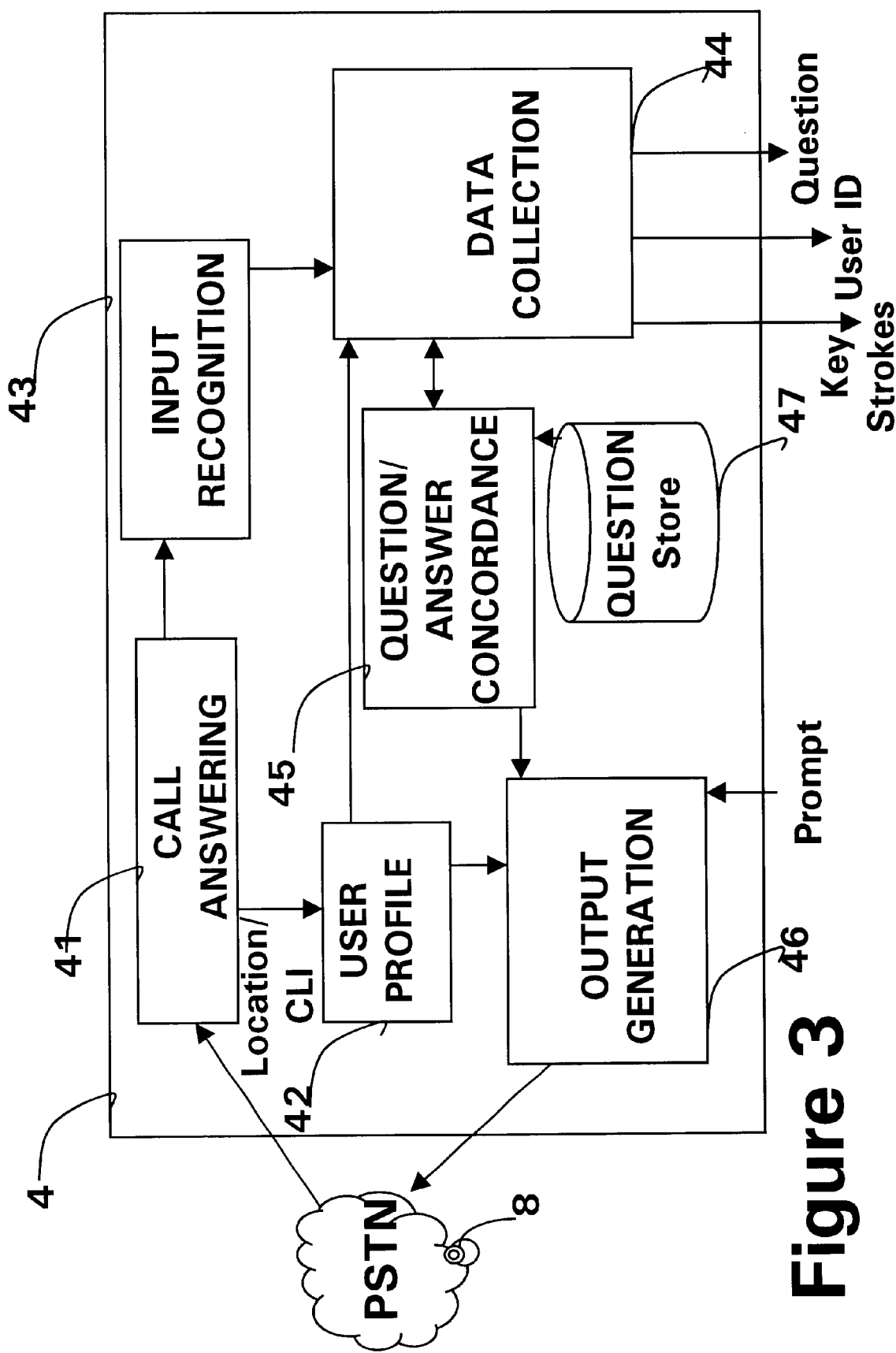
FIG. 3 illustrates schematically the functional elements of the interface unit of the system.

This embodiment will be described primarily in relation to an audience voting system, but some variations for other purposes will be described, and others will be apparent to the reader skilled in the art.

Data entry handsets, embodied as standard DECT cordless telephones 1, or similar devices with a more limited functionality, are connectable via a transmission means, here embodied as a number of radio base stations 7, connected through a wireless Private Branch Exchange (WPBX) 2 and the Public Switched Telephone Network (PSTN) 8 to a data processing system 5, (typically a suitably-programmed general-purpose computer), by way of an associated Computer/Telephony Interface (CTI) unit 4. It should be clearly understood that this arrangement is illustrative. The Computer/telephony interface unit 4 and computer 5 may be integrated into a single unit, or they may be located separately, communicating with each other over a private or public telecommunications data link. The Computer/telephony interface unit 4 may be integrated with, or colocated with, the PBX 2, instead of communicating by way of the PSTN 8.

The Computer/telephony interface unit 4 answers calls and responds to user inputs, for example using a voice recognition system, or by the detection of key presses (presented as DTMF (dual-tone multi-frequency) signals). It comprises a call-answering unit 41 for receiving incoming calls. The calling line identity (CLI) signal associated with each call, is extracted and passed to a user profile unit 42 which identifies the caller and passes the identity to a data collection unit 44. The location of the user, as identified by the base station 7 to which the user is working, may also be identified to the data collection unit 44. The data (keystrokes etc) transmitted by the caller are identified in an input recognition unit 43. The data collection unit 44 provides an output to the processor 5, consisting of each user's input, identified by user and location.

The computer 5 receives this basic numeric data, and processes it in a processing element 51 to generate an output, for example a graphical display, using a graphics function 52. The graphics are converted to HTML format (formatter 53) and mounted on an Internet/IntraNet World Wide Web server 54. Using the "server push" process, the WWW pages are then "pushed" to a browser program controlling a computer 6, to display the information. The computer 5 also has a store 55 to allow the data to be stored for subsequent retrieval. The computer display 6 may be located at any point where the results of the voting are required. For an audience participation system it would typically be displayed on a screen for the audience to see. For examinations, market research, and access control systems, the display 6 would be located at a position convenient to the person requiring the data. The "Internet" 9, or a private "Intranet" where available, is a suitable medium for communication of the data from the server 54 to the browser 6.

In some embodiments different users are required to take different actions to respond to the same question, or are responding to different questions. The questions being asked of each user are selected from a store 47 by a concordance unit 45, which is responsive to the user's location (identified by the user profile unit 42), previous answers (identified by the data collection unit 44), and other data available from the collection unit 44. It may also introduce a random element to the questions, to avoid the meaning of an individual users' keystrokes being known to other users.

The concordance unit 45 generates an output for the data collection unit, indicating to what question the inputs received from the input recognition unit 43 relates, for transmission to the computer 5. The concordance unit 45 may also control an output generation unit 46, which transmits the questions and other prompts to the user. Alternatively, the prompt may be generated by the computer 5. In one version of this embodiment, the prompt takes the form of an audio signal generated by a speech synthesiser embodied in the output generator 46, under the control of the computer 5. Alternatively, audio information, including recorded and/or synthetic speech, can instead be included in the HTML format generated by the formatter 53 and delivered to the browser 6 and also to the Computer/Telephony Interface unit 4 to be forwarded to the cordless phones 1.

In use, a number of DECT cordless telephones 1, or limited-function equipment based on DECT technology, are provided to the audience in an auditorium or the like. These cordless telephones 1 are connectable over a radio interface to a wireless private exchange WPBX 2, using one or more fixed base stations (7) within the auditorium. The WPBX 2 has sufficient capacity to handle calls simultaneously, or in a short period, from all the cordless telephones 1, using a combination of time division and frequency division, for example as embodied in the DECT specification.

When votes are to be made, the users are invited to initiate the voting process. This invitation may be made by a human compere in the auditorium, by means of information displayed using the display browser 6 under the control of the computer 5, or by prompts transmitted to the handsets 1 by way of the interface unit 4. This invitation requires the users to set up a call to the Computer/Telephony Interface Unit 4 by dialling a predetermined number. This number may be pre-programmed into each cordless telephone 1, or into the PBX 2, so that it may be dialled using one of the conventional short code memory keys. The call answering unit 41 of the Computer/Telephony Interface Unit uses calling line identity (CLI) to identify any callers who are not calling through the cordless PBX 2 and are not eligible to vote. If some remote PSTN lines or cellular users are also to be connected to the computer/telephony unit 4 by way of the PBX 2, an association between the CLI identity of that line and the PBX 2 can be created in the user profile function 42 of the Computer/telephony interface unit 4, so that the call answering unit 41 can recognise the remote user 3 as a valid CLI. In this way votes may be contributed from authorised parties elsewhere than in the local auditorium. Effectively, the remote line becomes part of a "virtual" private network.

Calls may be set up by means of prompts transmitted by way of the WPBX 2 to the individual telephones 1. If the Computer/Telephony Interface Unit 4 is used in this way to set up the calls to the remote users, the identity of each connection will be known to the unit. This will again allow authentication of the results.

The choices may be a simple yes/no, or a multiple choice system, using the keypad of the telephone. On being invited to vote, the users transmit DTMF (dual tone multi-frequency) signals using the keys of their telephone handsets, or speak into their handsets if voice prompts are to be used. A separate channel is provided between the Computer/Telephony Interface unit 4 and each cordless telephone or remote user. The votes are detected by the input recognition unit, and collated with the user identity collected by the user profile unit 42 for collection bt the data collection unit 44. The Computer/Telephony Interface unit 4 can therefore identify each individual vote, and ensure that only one vote is received from each telephone.

In order to reduce the required bandwidth connecting the WPBX 2 to the computer telephony interface 4, polling may be used. The call answering unit 41 establishes contact with as many of the handsets as it can simultaneously communicate with. As it receives a vote from each handset, it ceases communication with that handset and establishes contact with another, from which it has yet to receive a vote. Each user is requested to maintain the selected key of his telephone depressed until he receives an indication from the output generator 46, e.g. an audible tone, that his vote has been registered by the call answering unit 41. Similarly, if the call answering unit 41 detects no DTMF signal from a given handset when that handset is polled, an audible indication to that effect may be transmitted by the generator 46 to the handset 1, to indicate to the user that his vote has not yet been registered. The system may be arranged such that if no vote is registered when a handset is polled, the call answering unit 41 ceases communication with that handset, and polls another, returning to the first handset later, by which time the user may have reached a decision and selected a key.

The DTMF tones or other indications received by the call answering unit 41 are processed by the input recognition unit 43 into voting data, for collection by the data collection unit 44 and onward transmission to the computer 5. The computer 5 comprises vote-processing software 51 for analysing the raw voting data. The results of this analysis may be supplied to a graphics or text generation function 52 to generate representations of the statistics of the votes cast, which can be transmitted by an HTML formatting function 53 or the like to a WorldWideWeb server 54 or local server, for display on a display browser 6. This allows the audience to receive the voting results. Since the identity of each handset is known to the Computer/Telephony Interface Unit 4, demographic data relating to the individual users of the handsets, or to earlier voting results, may be retrieved from a store 55, to provide further information for processing by the computer 5. Similarly, in an examination, the individual responses can be processed to assess each user's total score. Remote users can receive the data over any suitable communications link, such as by a connection through the Internet 9 to the computer 5.

The computer 5 can also generate audio information for transmission by way of the Computer/Telephony Interface Unit 4 and the WPBX 2 to the audience's telephones 1, 3. Audio information may relate to the statistical results of the vote processing carried out by the computer 5 in addition to, or as an alternative to, the display by the display browser 6. The audio information may be supplied to the interface 4 in the form of controls to operate a speech synthesiser in the output generation unit 46. The audio information may present the voting instructions in a tailored manner to the individual users. For example audio information may be supplied to the Computer/Telephony Interface Unit 4 in several languages. The user profiles 42 are used by the output generation unit 46 to select the appropriate language for transmission over each individual telephone connection by way of the WPBX 2 to the individual cordless telephones 1, and to the remote users 3.

The question/answer unit 45 may be used to generate supplementary questions, the nature of which depend on the responses to previous questions collected by the data collection unit. The supplementary questions are transmitted to the user through the output generation unit 46. They are also identified to the data collection unit 44, so that the data collection unit 44 can match a response to such a supplementary question, received by the input recognition unit 43, to the question which prompted it.

In an examination, the question/answer unit 45 may present the various possible answers, from which the correct answer is to be selected, to different users in a different order, so that one candidate cannot achieve the same result as another simply by copying keystrokes. This is achieved by randomising the questions generated by the question/answer concordance unit 45. Alternatively, the questions themselves may be presented in a different order to different candidates. It is, of course, necessary for this randomisation to be made known to the data collection unit 44. The data collection unit 44 then identifies the question asked, and the answer given, and transmits the results to the computer 5 to assess each candidate's performance. The question/answer unit 45 may also select which questions to transmit to the user in response to the data received by the data collection unit 44, for example to increase the difficulty of questions if the user has given correct responses to a high proportion of questions.

In a variation of the system for use in shops, exhibitions, museums, tourist attractions, and the like, the information to be transmitted by the Computer/telephony interface unit 4 may be selected according to the current location of the user as determined by identification of the currently serving radio base station. The information may also be selected according to pre-programmed information selected by the user and stored in the user profile unit 42, such as his preferred language, special interests, age, and the time he has available.

So far, the invention has been described in relation to an embodiment in which the computer 5 is associated with the private telephone exchange 2. However, some of the functionality of the computer 5, in particular the statistical processing, may be performed by a network-based system such as the OPRA system already mentioned. This arrangement is particularly suited to distributed systems, in which the statistical data is to be generated from data supplied from several private exchanges 2. The or each interface unit 4 may be associated with the respective private branch exchange 2, exchanging data with the computer 5 by means of a high speed data link (for example an ISDN (Integrated Services Data Network).

What is claimed is:

1. A data collection system comprising
a data processing system (5) for receiving data and generating statistical information relating to the data;
a plurality of data entry means (1), each for receiving data input from a user and transmitting the data to the data processing system (5);
and transmission means (7, 2) for transmitting data from the means (1) to the data processing system;
characterised in that the data entry means (1) are telephone handsets, and that the data processing system (5) has associated interface means (4) for identifying the individual telephone handsets (1) from which each data item is received, such that individual data items transmitted from the same handset can be related to each other by the processing system (5).

2. A data collection system according to claim 1, in which the processing system (5) has means for transmitting audio or visual information to the handsets (1).

3. A data collection system according to claim 1, in which the transmission means (2) comprises a telephone switching system, and the interface means (4) is arranged such that it will only accept telephone calls from telephone handsets associated with the switching means (2).

4. A data collection system according to claim 3, wherein the telephone switching system (2) and the data processing system (5) communicate with each other at least partly by means of the public telephone network (8), and the telephone switching system (2) has number translation means for conversion of short codes transmitted from the individual handsets (1) into full telephone numbers for transmission over the public telephone network (8) to the interface means (4).

5. A method of generating statistical information relating to data received from a plurality of data entry means (1), comprising the steps of transmitting signals from each data entry means (1) to a data processing system (5) by way of an interface means (4);

processing the data so received to generate statistical information relating to the totality of data received from the means (1)

characterised in that the data entry means (1) are telephone handsets, and that the interface means (4) identifies the individual telephone handsets (1) from which each data item is received, such that individual data items transmitted from the same handset can be related to each other by the processing system (5).

6. A method according to claim 5, wherein audio or visual information is transmitted from the data processing system (5) to the data entry handsets (1).

7. A method according to claim 5 wherein the location of the data entry handset is identified, and the information generated is selected according to said location.

8. A method as claimed in claim 7, wherein the data entry handset (1) communicates with the interface means (4) by means of a cordless connection, using a network of cordless base stations (7), and the location of the user apparatus (1) is identified by reference to the base station (7) currently in cordless communication with the user apparatus (1).

9. A method according to claim 5, wherein the telephone calls are made through a private exchange (2).

10. A method according to claim 9, wherein the interface means (4) only accepts telephone calls from handsets (1) associated with the private exchange (2).

11. A method according to claim 9, at least part of the communication between the data processing system (5) and the private exchange (2) is carried out by means of the public telephone network (8), wherein the private telephone exchange system (2) converts short codes transmitted from the individual handsets (1) into full telephone numbers for transmission over the public telephone network (8) to the data processing system (5).

12. A method according to claim 5, wherein an output is generated for transmission using Internet protocols.

\* \* \* \* \*